United States Patent
Tietze et al.

(10) Patent No.: US 9,580,577 B2
(45) Date of Patent: Feb. 28, 2017

(54) LOW DIELECTRIC LOSS THERMOSET RESIN SYSTEM AT HIGH FREQUENCY FOR USE IN ELECTRICAL COMPONENTS

(75) Inventors: Roger Tietze, The Woodlands, TX (US); Yen-Loan Nguyen, Spring, TX (US)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 961 days.

(21) Appl. No.: 13/580,179

(22) PCT Filed: Mar. 2, 2011

(86) PCT No.: PCT/US2011/026786
§ 371 (c)(1),
(2), (4) Date: Aug. 21, 2012

(87) PCT Pub. No.: WO2011/109463
PCT Pub. Date: Sep. 9, 2011

(65) Prior Publication Data
US 2012/0318571 A1 Dec. 20, 2012

Related U.S. Application Data

(60) Provisional application No. 61/310,913, filed on Mar. 5, 2010.

(51) Int. Cl.
*C08K 5/357* (2006.01)
(52) U.S. Cl.
CPC ....... *C08K 5/357* (2013.01); *Y10T 428/31529* (2015.04); *Y10T 442/2475* (2015.04); *Y10T 442/3382* (2015.04)

(58) Field of Classification Search
CPC .................. C08L 63/00; C08K 5/357
USPC .......................................... 523/451
See application file for complete search history.

(56) References Cited

U.S. PATENT DOCUMENTS

| | | |
|---|---|---|
| 2004/0123948 A1 | 7/2004 | Dershem et al. |
| 2006/0142427 A1 | 6/2006 | Levchik et al. |
| 2007/0221890 A1* | 9/2007 | Gan .............. C07F 9/657172 252/601 |
| 2008/0302471 A1 | 12/2008 | Tsuei |
| 2008/0319124 A1 | 12/2008 | Kurihara et al. |

FOREIGN PATENT DOCUMENTS

| | | | | |
|---|---|---|---|---|
| WO | 2005/118604 | 12/2005 | | |
| WO | WO 2010018008 A1 * | 2/2010 | ........... | H01L 23/29 |

* cited by examiner

*Primary Examiner* — Megan McCulley
(74) *Attorney, Agent, or Firm* — Huntsman International LLC

(57) ABSTRACT

The present disclosure provides a thermosetting resin composition including a benzoxazine component comprising two or more benzoxazine monomer compounds and at least one epoxy resin characterized in that a resultant cured product formed by curing the thermosetting resin composition possesses high heat resistance and low dielectric loss at high frequency. The thermosetting resin composition is especially suited for use in high speed printed circuit boards and semiconductor devices.

12 Claims, No Drawings

LOW DIELECTRIC LOSS THERMOSET RESIN SYSTEM AT HIGH FREQUENCY FOR USE IN ELECTRICAL COMPONENTS

CROSS REFERENCE TO RELATED APPLICATIONS

This application is the National Phase of International Application PCT/EP2011/026786 filed Mar. 2, 2011 which designated the U.S. and which claims priority to U.S. Pat. App. Ser. No. 61/310,913 filed Mar. 5, 2010. The noted applications are incorporated herein by reference.

STATEMENT REGARDING FEDERALLY SPONSORED RESEARCH OR DEVELOPMENT

Not Applicable.

FIELD OF INVENTION

This present disclosure relates to benzoxazine-based thermosetting resin compositions and to their uses in various applications, such as, in the production of a prepreg, a laminated board for printed wiring board, a molding material and an adhesive.

BACKGROUND OF THE INVENTION

Articles prepared from resin compositions having improved resistance to elevated temperatures as well as low dielectric loss are desirable for many applications. In particular, such articles are desirable for use in prepregs and laminates for printed circuit board (PCB) and semiconductor applications as industries head toward higher circuit densities, increased board thickness, lead free solders, higher temperature and higher frequency use environments.

Laminates, and particularly structural and electrical copper clad laminates, are generally manufactured by pressing, under elevated temperatures and pressures, various layers of partially cured prepregs and optionally copper sheeting. Prepregs are generally manufactured by impregnating a curable thermosettable epoxy resin composition into a porous substrate, such as a glass fiber mat, followed by processing at elevated temperatures to promote a partial cure of the epoxy resin in the mat to a "B-stage." Complete cure of the epoxy resin impregnated in the glass fiber mat typically occurs during the lamination step when the prepreg layers are pressed under high pressure and elevated temperatures for a certain period of time.

While epoxy resin compositions are known to impart enhanced thermal properties for the manufacture of prepregs and laminates, such epoxy resin compositions are typically more difficult to process, more expensive to formulate, and may suffer from inferior performance capabilities for complex printed circuit board circuitry and for higher fabrication and usage temperatures.

In light of the above, there is a need in the art for resin compositions which may be used in preparing articles having improved thermal properties and low dielectric loss at high frequency and for processes to produce such articles.

SUMMARY OF THE INVENTION

The present disclosure provides a thermosetting resin composition including:
(a) a benzoxazine component comprising two or more benzoxazine monomer compounds; and
(b) at least one epoxy resin characterized in that a resultant cured product formed by curing the thermosetting resin composition contains at least two or more of the following well-balanced properties: (1) a glass transition temperature (Tg) of greater than about 170° C.; (2) a decomposition temperature (Td) of greater than about 300° C.; (3) a time to delamination at 288° C. (T288) of greater than about 1 minute; (4) a UL94 flame retardancy ranking of at least V1; (5) a dielectric loss tangent of less than about 0.010 at 10 GHz; and, (6) a dielectric loss constant of less than about 4.00 at 10 GHz.

Another aspect of the present disclosure is directed to the use of the above thermosetting resin composition to obtain a prepreg or a metal-coated foil; and, to a laminate obtained by laminating the prepreg and/or the metal-coated foil.

DETAILED DESCRIPTION OF THE INVENTION

In accordance with certain embodiments, the thermosetting resin compositions disclosed herein are substantially halogen-free or halogen-free. As used herein the term "substantially halogen-free" refers to compositions that do not include any covalently bonded halogen groups in the final composition, but may include minimal amounts of residual halogens that are present in any remaining halogenated solvent or residual amounts of halogen that leaches from any containers or glassware used to synthesize and/or store the compositions. In certain examples, substantially halogen-free refers to less than about 0.12% by weight total halogen content in the final composition, more particularly less than about 0.09% by weight total halogen content in the final composition. Though residual amounts of halogen may be present in the final compositions, the residual amount does not impart, or retract from, the physical properties, e.g., flame retardancy, peel strength, dielectric properties, etc., of the final composition. In addition, any residual amounts of halogen that are present do not generate appreciable amounts of dioxin, or other toxic substances, during burning to be considered a health hazard to mammals, such as humans.

It will be recognized by persons of ordinary skill in the art, given the benefit of this disclosure, that the thermosetting resin compositions, and articles made using the thermosetting resin compositions, provide significant advantages not achieved with state of the art compositions. The thermosetting resin compositions may be used in the assembly of various single and multi-layered articles including, but not limited to, laminates, printed circuit boards, molded articles, aircraft plastics, silicon chip carriers, structural composites, resin coated foils, unreinforced substrates for high density circuit interconnect applications and other suitable applications where it may be desirable to use single or multi-layered articles having flame retardant and/or excellent electrical properties especially at high frequency.

According to one aspect, the present disclosure is directed to a thermosetting resin composition including: (a) a benzoxazine component comprising two or more benzoxazine monomer compounds; and (b) at least one epoxy resin characterized in that a resultant cured product formed by curing the thermosetting resin composition contains at least two or more of the following well-balanced properties: (1) a glass transition temperature (Tg) of greater than about 170° C.; (2) a decomposition temperature (Td) of greater than about 300° C.; (3) a time to delamination at 288° C. (T288) of greater than about 1 minute; (4) a UL94 flame retardancy ranking of at least V1; (5) a dielectric loss tangent of less than about 0.010 at 10 GHz; and (6) a dielectric loss constant of less than about 4.00 at 10 GHz.

Benzoxazine Component

The thermosetting resin composition of the present disclosure includes from about 10-90 parts by weight, preferably from about 30-50 parts by weight, and more preferably from about 35-45 parts by weight, per 100 parts by weight of the thermosetting resin composition, of a benzoxazine component comprising two or more benzoxazine monomer compounds. As used herein, the term "benzoxazine monomer" refers to a monomer having at least one substituted or unsubstituted benzoxazine group. The benzoxazine monomer may be a mono-functional, di-functional, or tri-functional benzoxazine compound.

The benzoxazine monomer may be represented by the general formula

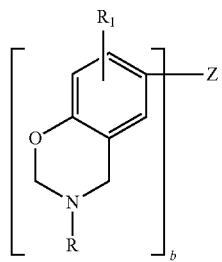

wherein b is an integer from 1 to 3; R is a substituted or unsubstituted $C_1$-$C_{20}$ alkyl group, a substituted or unsubstituted $C_2$-$C_{20}$ alkenyl group, a substituted or unsubstituted $C_6$-$C_{20}$ aryl group, a substituted or unsubstituted $C_2$-$C_{20}$ heteroaryl group, a substituted or unsubstituted $C_4$-$C_{20}$ carbocyclic group, a substituted or unsubstituted $C_2$-$C_{20}$ heterocyclic group, or a $C_3$-$C_{10}$ cycloalkyl group; $R_1$ is hydrogen, an alkyl group or an alkenyl group; and Z is a direct bond (when b=2), a substituted or unsubstituted $C_1$-$C_{20}$ alkylene group, a substituted or unsubstituted $C_6$-$C_{20}$ arylene group, a substituted or unsubstituted $C_2$-$C_{20}$ heteroarylene group or C=O.

In one embodiment, at least one of the benzoxazine monomers is a compound of the general formula (I)

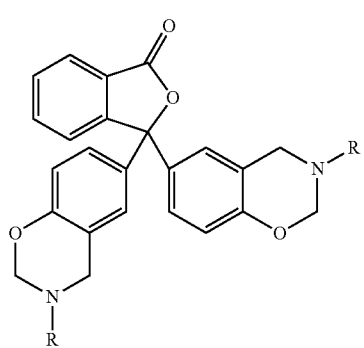

and at least another benzoxazine monomer is a compound of the general formula (II):

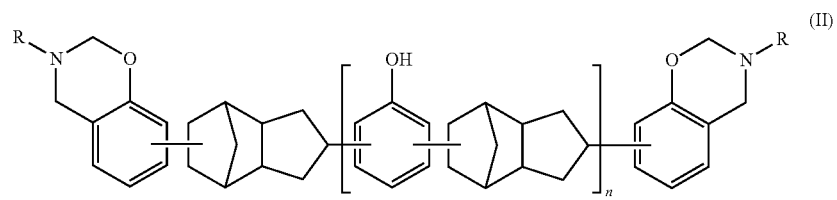

wherein each R is, independently from one another, allyl, unsubstituted or substituted phenyl, unsubstituted or substituted $C_1$-$C_8$ alkyl or unsubstituted or substituted $C_3$-$C_8$ cycloalkyl and n is an integer from 0 to 5. Suitable substituents on the R-groups include amino, $C_1$-$C_4$ alkyl and allyl. One to four substituents may be present on the R-group. Preferably, the R-groups are the same and more preferably are phenyl.

The relative amount of the benzoxazine monomer compound of formula (I) and the benzoxazine monomer compound of the formula (II) may be 90:10-10:90 (weight: weight), preferably 70:30-30:70 (weight:weight) and more preferably 60:40-40:60 (weight:weight), and even more preferably about 50:50 (weight:weight).

Examples of benzoxazine monomer compounds which may be used include those available commercially from several sources including Huntsman Advanced Materials Americas LLC., Georgia Pacific Resins Inc. and Shikoku Chemicals Corporation. The benzoxazine monomer compounds may also be obtained by reacting a phenol compound, for example, bisphenol A or phenolphthalein or dicyclopentadiene novolac, with an aldehyde, for example, formaldehyde, and a primary amine, under conditions in which water is removed. The molar ratio of phenol compound to aldehyde may be from about 1:3 to 1:10, preferably from about 1:4: to 1:7, and more preferably from about 1:4.5 to 1:5. The molar ratio of phenol compound to primary amine reactant may be from about 1:1 to 1:3, preferably from about 1:1.4 to 1:2.5, and more preferably from about 1:2.1 to 1:2.2. Examples of primary amines include: aromatic mono- or di-amines, aliphatic amines, cycloaliphatic amines and heterocyclic monoamines; for example, aniline, o-, m- and p-phenylene diamine, benzidine, 4,4'-diaminodiphenyl methane, cyclohexylamine, butylamine, methylamine, hexylamine, allylamine, furfurylamine ethylenediamine, and propylenediamine. The amines may, in their respective carbon part, be substituted by $C_1$-$C_8$ alkyl or allyl. Preferred primary amines are according to the general formula $R_aNH2$, wherein $R_a$ is allyl, unsubstituted or substituted phenyl, unsubstituted or substituted $C_1$-$C_8$ alkyl or unsubstituted or substituted $C_3$-$C_8$ cycloalkyl. Suitable substituents on the $R_a$ group include amino, $C_1$-$C_4$ alkyl and allyl. Typically, one to four substituents may be present on the $R_a$ group. Preferably $R_a$ is phenyl.

Epoxy Resin

The thermosetting resin composition of the present disclosure also includes from about 2-60 parts by weight, preferably from about 10-40 parts by weight, per 100 parts by weight of the thermosetting resin composition, of at least one epoxy resin.

The epoxy resin for use in the present disclosure is not particularly limited, but preferably is an epoxy resin having two or more epoxy groups in a molecule. Examples thereof include novolak epoxy resins prepared by epoxidation of a novolak resin obtained by condensation or co-condensation of a phenol such as phenol, cresol, xylenol, resorcin, catechol, bisphenol A, or bisphenol F and/or a naphthol such as α-naphthol, β-naphthol, or dihydroxynaphthalene with an aldehyde group-containing compound such as formaldehyde, acetaldehyde, propionaldehyde, benzaldehyde, or salicyl aldehyde under the presence of an acidic catalyst, such as phenolic novolak epoxy resin and ortho-cresol novolak epoxy resin; diglycidyl ethers of bisphenol A, bisphenol F, bisphenol S, alkyl-substituted or unsubstituted biphenol, stilbene-based phenol, or the like (bisphenol epoxy resin, biphenyl epoxy resin, and stilbene epoxy resin) and glycidyl ethers of an alcohol such as butanediol, polyethylene glycol, or polypropylene glycol; glycidyl ester epoxy resins prepared by using a carboxylic acid such as phthalic acid, isophthalic acid, tetrahydrophthalic acid, or the like; glycidyl or methylglycidyl epoxy resins having a nitrogen atom such as of aniline or isocyanuric acid, an active hydrogen bound thereto being substituted with a glycidyl group; alicyclic epoxy resins obtained by intramolecular epoxidation of an olefin bond such as vinylcyclohexene diepoxide, 3,4-epoxycyclohexylmethyl-3,4-epoxycyclohexanecarboxylate, and 2-(3,4-epoxy)cyclohexyl-5,5-spiro(3,4-epoxy)cyclohexane-m-dioxane; glycidyl ethers of para-xylylene and/or meta xylylene-modified phenol resins; glycidyl ethers of terpene-modified phenol resins; glycidyl ethers of dicyclopentadiene-modified phenol resins; glycidyl ethers of cyclopentadiene-modified phenol resins; glycidyl ether of polycyclic aromatic ring-modified phenol resins; glycidyl ethers of naphthalene ring-containing phenol resins; halogenated phenolic novolak epoxy resins; hydroquinone epoxy resins; trimethylolpropane epoxy resins; linear aliphatic epoxy resins obtained by oxidation of an olefin bond with a peracid such as peracetic acid; diphenylmethane epoxy resins; epoxide of aralkyl phenol resins such as phenol aralkyl resins and naphthol aralkyl resins; sulfur atom-containing epoxy resins; and naphthalene epoxy resins, and these resins may be used alone or in combination of two or more.

Catalyst

The thermosetting resin composition may further contain a catalyst for more efficient curing. Thus in another aspect, the thermosetting resin composition also contains from about 0.1-50 parts by weight, preferably from about 0.5-45 parts by weight, per 100 parts by weight of the thermosetting resin composition, of a catalyst.

Examples of catalysts suitable for use include amine compounds, compounds produced from the amine compounds, tertiary amine compounds, imidazole compounds, hydrazide compounds, melamine compounds, acid anhydrides, phenolic compounds, cyanate ester compounds, dicyandiamides, and mixtures thereof.

Examples of amine compounds include, but are not limited to, ethylenediamine, diethylenetriamine, triethylenetetramine, tetraethylenepentamine, diethylaminopropylamine, methylenedianiline, benzylmethylamine, polyoxypropylenediamine, polyoxypropylenetriamine, cycloaliphatic amine and their derivatives such as menthenediamine, isophoronediamine, bis(4-amino-3-methylcyclohexyl)methane, diaminodicyclohexylmethane, bis(aminomethyl)cyclohexane, and N-aminoethylpiperazine, m-xylenediamine, diaminodiphenyl sulfone, m-phenylenediamine and α-(m/p-aminophenyl)ethylamine.

Examples of compounds produced from the above amine compounds include, but are not limited to, polyaminoamides produced from the amine compounds and carboxylic acid compounds such as succinic acid, adipic acid, azelaic acid, sebacic acid, dodecanedioc acid, isophthalic acid, terephthalic acid, dihydroisophthalic acid, tetrahydroisophthalic acid, hexahydroisophthalic acid; polyaminoamide compounds produced from the amine compounds and maleimide compounds such as diaminodiphenylmethane-bismaleimide; ketimine compounds produced from the amine compounds and ketones; and polyamino compounds produced from the amine compounds and other compounds such as epoxy compounds, urea, thiourea, aldehydes phenols and acrylic compounds.

Examples of tertiary amine compounds include, but are not limited to, N,N-dimethylpiperazine, pyridine, picoline, benzyldimethylamine, 2-(dimethylaminoethyl)phenol, 2,4,6-tris(dimethylaminoethyl)phenol, and 1,8-diazabiscyclo(5,4,0) undec-7-ene.

Examples of imidazole compounds include, but are not limited to, 1-methylamidazole, 2-methylimidazole, 2-ethyl-4-methylimidazole, 2-undecylimadazole, 2-heptadecylimidazole, and 2-phenylimidazole.

Examples of hydrazide compounds include, but are not limited to, 1,3-bis(hydrazinocarboethyl)-5-isopropylhydantoin, 7,11-octadecadiene-1,18-dicarbohydrazide, eicosanediacid dihydrazide, and adipic acid anhydride.

An example of melamine compound includes, but not limited to, 2,4-diamino-6-vinyl-1,3,5-triazine.

Examples of acid anhydrides include, but are not limited to, phthalic anhydride, trimellitic anhydride, styrene maleic anhydride copolymers, pyromellitic anhydride, benzophenonetetracarboxylic anhydride, ethylene glycol bisanhydrotrimellitate, glycerol trisanhydrotrimellitate, methyltetrahydrophthalic anhydride, tetrahydrophthalic anhydride, nadic anhydride, methylnadic anhydride, trialklyltetrahydrophthalic anhydride, hexahydrophthalic anhydride, methylhexahydrophthalic anhydride, polyazelaic anhydride and chlorendic anhydride.

Examples of phenol compounds include, but are not limited to, phenol-novolac, o-cresol-novolac, p-cresol-novolac, t-butylphenol-novolac, and cresol-novolac having a dicyclopentadiene structure.

Examples of cyanate ester compounds include compounds having one or more cyanate ester functional groups, —OCN, including, but not limited to, 1,1'-bis(4-cyanotophenyl)ethane, bis(4-cyanate-3,5-dimethylphenyl)methane, 1,3-bis(cyanatophenyl-1-(1-methyl-ethylethyl-ethylidene)), 2,2'-bis(4-cyanotophenyl)ispopropylidene.

Flame Retardant

In another aspect, the thermosetting resin composition further includes a phosphonated flame retardant. In certain embodiments, the thermosetting resin composition includes between about 1 part by weight to about 20 parts by weight, per 100 parts by weight of the thermosetting resin composition, of the phosphonated flame retardant. In other embodiments, the thermosetting resin composition includes between about 4 parts by weight to about 15 parts by weight of the phosphonated flame retardant, and preferably between about 5 parts by weight to about 10 parts by weight, per 100 parts by weight of the thermosetting resin composition, of the phosphonated flame retardant.

The exact chemical form of the phosphonated flame retardant can vary based on thermosetting resin composition. For example, in certain embodiments, the phosphonated flame retardant has a formula as shown below in formulae (III)-(V).

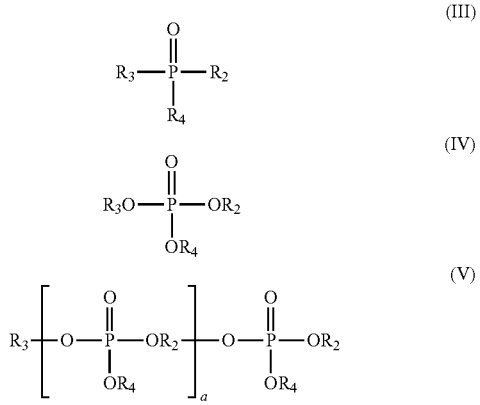

In formulae (III)-(V), $R_2$, $R_3$ and $R_4$ each may be independently selected from the group consisting of substituted or unsubstituted alkyl, substituted or unsubstituted aryl, substituted or unsubstituted alicyclic and substituted or unsubstituted heterocyclic groups that include nitrogen, oxygen and/or phosphorous; and a is an integer from 1 to 20.

Exemplary commercially available materials that can be used include, but are not limited to, ammonia polyphosphates such as Exolit APP-422 and APP-423 (commercially available from Clariant), and Antiblaze® MC flame retardants (commercially available from Albemarle), melamine polyphosphates such as Melapurg-200 and Melapurg-MP (commercially available from Ciba) and Fyrol(V-MP) (commercially available from Akzo Nobel), organic phosphonates such as OP-930 and OP-1230 (commercially available from Clariant) and polyphenylene phosphonates such as Fyrol PMP (commercially available from Akzo Nobel).

Optional Additives

The thermosetting resin composition may also include, if necessary, additives for enhancing strength, release properties, hydrolysis resistance, electrical conductivity and other characteristics. The additives may be added to the thermosetting resin composition in an amount of less than about 50 parts by weight, preferably less than about 30 parts by weight and most preferably less than about 20 parts by weight, per 100 parts by weight of the thermosetting resin composition.

Such optional additives may include inert, particulate fillers such as talc, clay, mica, silica, alumina, and calcium carbonate. Fabric wettability enhancers (e.g. wetting agents and coupling agents) may also be advantageous under certain conditions. In addition, such materials as antioxidants, thermal and ultraviolet stabilizers, lubricants, antistatic agents, micro or hollow spheres, dyes, and pigments may also be present.

Organic Solvent

In some embodiments, the thermosetting resin composition may be dissolved or dispersed in an organic solvent. The amount of solvent is not limited, but typically is an amount sufficient to provide a concentration of solids in the solvent of at least 30% to no more than 90% solids, preferably between about 55% and about 85% solids, and more preferably between about 60% and about 75% solids.

The organic solvent is not specifically limited and may be a ketone, an aromatic hydrocarbon, an ester, an amide or an alcohol. More specifically, examples of organic solvents which may be used include, acetone, methyl ethyl ketone, methyl isobutyl ketone, cyclohexanone, toluene, xylene, methoxyethyl acetate, ethoxyethyl acetate, butoxyethyl acetate, ethyl acetate, N-methylpyrrolidone formamide, N-methylformamide, N,N-dimethylacetamide, methanol, ethanol, ethylene glycol, ethylene glycol monomethyl ether, ethylene glycol monoethyl ether, diethylene glycol, triethylene glycol monomethyl ether, triethylene glycol monoethyl ether, triethylene glycol, propylene glycol monomethyl ether, dipropylene glycol monoethyl ether, propylene glycol monopropyl ether, dipropylene glycol monopropyl ether, and mixtures thereof.

The thermosetting resin compositions of the present disclosure can be prepared in known manner, for example, by premixing individual components and then mixing these premixes, or by mixing all of the components together using customary devices, such as a stirred vessel, stirring rod, ball mill, sample mixer, static mixer or ribbon blender. Once formulated, the thermosetting resin composition of the present disclosure may be packaged in a variety of containers such as steel, tin, aluminium, plastic, glass or cardboard containers.

According to another embodiment, the thermosetting resin composition of the present disclosure is prepared by mixing together from about 10-90 parts by weight of the benzoxazine component and from about 2-60 parts by weight of the epoxy resin. In another embodiment, the thermosetting resin composition is prepared by mixing together from about 10-90 parts by weight of the benzoxazine component, from about 2-60 parts by weight of the epoxy resin, from about 0.1-50 pails by weight of catalyst, from about 1-20 parts by weight of the phosphonated flame retardant, and from about 1-50 parts by weight of the solvent, per 100 parts by weight of the thermosetting resin composition. The thermosetting resin composition, once mixed, may then be applied to an article or substrate and cured at a temperature greater than 150° C. to form a composite article.

The thermosetting resin composition of the present disclosure can be used to make composite articles by techniques well known in the industry such as by pultrusion, moulding, encapsulation or coating. The thermosetting resin compositions of the present disclosure, due to their thermal properties, are especially useful in the preparation of articles for use in high temperature continuous use applications. Examples include electrical laminates and electrical encapsulation. Other examples include molding powders, coatings, structural composite parts and gaskets.

In another aspect, the present disclosure provides a process for preparing a resin coated article. The process steps include contacting an article or a substrate with a thermosetting resin composition of the present disclosure. Compositions of the present disclosure may be contacted with the article or substrate by any method known to those skilled in the art. Examples of such contacting methods include powder coating, spray coating, die coating, roll coating, resin infusion process, and contacting the article with a bath containing the thermosetting resin composition. In one embodiment the article or substrate is contacted with the thermosetting resin composition in a varnish bath. In another embodiment, the present disclosure provides for articles or substrates, especially prepregs and laminates, prepared by the process of the present disclosure.

In yet another aspect, the present disclosure provides a prepreg obtained by impregnating reinforcement with the thermosetting resin composition of the present disclosure.

The present disclosure also provides a metal-coated foil obtained by coating a metal foil with the thermosetting resin composition of the present disclosure.

In still another aspect, the present disclosure also provides a laminate with enhanced properties obtained by laminating the above prepreg and/or the above metal-coated foil.

The thermosetting resin composition of the present disclosure is amenable to impregnation of reinforcements, for example, glass cloth, and cures into products having heat resistance and/or low dielectric loss at high frequency, so that the composition is suitable for the manufacture of laminates which have a well-balance of properties, are well-reliable with respect to mechanical strength and electrically insulated at high temperatures. The reinforcements or reinforcing materials which may be coated with the thermosetting resin composition of the present disclosure include any material which would be used by one skilled in the art in the formation of composites, prepregs, and laminates. Examples of appropriate substrates include fiber-containing materials such as woven cloth, mesh, mat, fibers, and unwoven aramid reinforcements. Preferably, such materials are made from glass, fiberglass, quartz, paper, which may be cellulosic or synthetic, a thermoplastic resin substrate such as aramid reinforcements, polyethylene, poly(p-phenyleneterephthalamide), polyester, polytetrafluoroethylene and poly(p-phenylenebenzobisthiazole), syndiotatic polystyrene, carbon, graphite, ceramic or metal. Preferred materials include glass or fiberglass, in woven cloth or mat form.

In one embodiment, the reinforcing material is contacted with a varnish bath comprising the thermosetting resin composition of the present disclosure dissolved and intimately admixed in a solvent or a mixture of solvents. The coating occurs under conditions such that the reinforcing material is coated with the thermosetting resin composition. Thereafter the coated reinforcing materials are passed through a heated zone at a temperature sufficient to cause the solvents to evaporate, but below the temperature at which the thermosetting resin composition undergoes significant cure during the residence time in the heated zone.

The reinforcing material preferably has a residence time in the bath of from 1 second to 300 seconds, more preferably from 1 second to 120 seconds, and most preferably from 1 second to 30 seconds. The temperature of such bath is preferably from 0° C. to 100° C., more preferably from 10° C. to 40° C., and most preferably from 15° C. to 30° C. The residence time of the coated reinforcing material in the heated zone is from 0.1 minute to 15 minutes, more preferably from 0.5 minute to 10 minutes, and most preferably from 1 minute to 5 minutes.

The temperature of such zone is sufficient to cause any solvents remaining to volatilize away yet not so high as to result in a complete curing of the components during the residence time. Preferable temperatures of such zone are from 80° C. to 250° C., more preferably from 100° C. to 225° C., and most preferably from 150° C. to 210° C. Preferably there is a means in the heated zone to remove the solvent, either by passing an inert gas through the oven, or drawing a slight vacuum on the oven. In many embodiments the coated materials are exposed to zones of increasing temperature. The first zones are designed to cause the solvent to volatilize so it can be removed. The later zones are designed to result in partial cure of the thermosetting resin components (B-staging).

One or more sheets of prepreg are preferably processed into laminates optionally with one or more sheets of electrically-conductive material such as copper. In such further processing, one or more segments or parts of the coated reinforcing material are brought in contact with one another and/or the conductive material. Thereafter, the contacted parts are exposed to elevated pressures and temperatures sufficient to cause the components to cure wherein the resin on adjacent parts react to form a continuous resin matrix between the reinforcing material. Before being cured the parts may be cut and stacked or folded and stacked into a part of desired shape and thickness. The pressures used can be anywhere from 1 psi to 1000 psi with from 10 psi to 800 psi being preferred. The temperature used to cure the resin in the parts or laminates, depends upon the particular residence time, pressure used, and resin used. Preferred temperatures which may be used are between 100° C. and 250° C., more preferably between 120° C. and 220° C., and most preferably between 170° C. and 200° C. The residence times are preferably from 10 minutes to 120 minutes and more preferably from 20 minutes to 90 minutes.

In one embodiment, the process is a continuous process where the reinforcing material is taken from the oven and appropriately arranged into the desired shape and thickness and pressed at very high temperatures for short times. In particular such high temperatures are from 180° C. to 250° C., more preferably 190° C. to 210° C., at times of 1 minute to 10 minutes and from 2 minutes to 5 minutes. Such high speed pressing allows for the more efficient utilization of processing equipment. In such embodiments the preferred reinforcing material is a glass web or woven cloth.

In some embodiments it is desirable to subject the laminate or final product to a post cure outside of the press. This step is designed to complete the curing reaction. The post cure is usually performed at from 130° C. to 220° C. for a time period of from 20 minutes to 200 minutes. This post cure step may be performed in a vacuum to remove any components which may volatilize.

In another aspect, the thermosetting resin composition, upon mixing and curing, provides a cured product, for example a laminate, with excellent well-balanced properties. The properties of the cured product that are well-balanced in accordance with the present disclosure include at least two of: a glass transition temperature (Tg) of greater than about 170° C., preferably greater than about 175° C., and more preferably greater than about 180° C.; a decomposition temperature (Td) of greater than about 300° C., preferably greater than about 310° C., and more preferably greater than about 325° C.; a time to delamination at 288° C. (T288) of greater than about 1 minute, preferably greater than about 10 minutes, and more preferably greater than about 30 minutes, a flame retardancy in terms of a UL94 ranking of at least V1 and preferably V0; a dielectric loss tangent of less than about 0.010 at 10 GHz, preferably less than about 0.0097 at 10 GHz and more preferably less than about 0.0095 at 10 GHz; and a dielectric constant of less than about 4.00 at 10 GHz, preferably less than about 3.80 at 10 GHz, more preferably less than about 3.70 at 10 GHz, and even more preferably less than about 3.55 at 10 GHz.

EXAMPLES

The following components in Table 1 were added to a glass container and sufficiently mixed to homogeneity to form a thermosetting resin composition according to the present disclosure

TABLE 1

| Component | Example 1 (wt %) | Example 2 (wt %) | Example 3 (wt %) | Example 4 (wt %) | Example 5 (wt %) | Example 6 (wt %) |
|---|---|---|---|---|---|---|
| Phenolphthalein-based benzoxazine | 12.6 | 12.6 | 12.6 | 12.6 | 12.6 | 10.5 |
| Dicyclopentadiene-based benzoxazine | 12.6 | 12.6 | 12.6 | 12.6 | 12.6 | 24.3 |
| Naphthalene-based epoxy | 25.2 | 7.6 | 7.5 | 15 | 5 | 10.3 |
| Phosphonated flame retardant | 7 | 9.5 | 12.0 | 9.5 | 12 | 16.6 |
| Styrene maleic anhydride | 12.6 | 27.7 | 25.2 | 20.3 | 27.7 | 38.3 |
| MEK | 30 | 30 | 30 | 30 | 30 | 30 |

The thermosetting resin compositions were then analytically tested and exhibited the following properties:

TABLE 2

| Property | Examples 1 to 6 |
|---|---|
| Aspect (visual) | Clear amber liquid |
| % Solids | 68%-72% |
| Gel time at 171° C. | 300 s-600 s |
| Color (Gardner, ISO 4630) | 13-14 |
| Viscosity at 25° C. (ISO 12058-1) | 200 cPs to 700 cPs |
| Flash Point (ISO 2719) | 25° F. (MEK) |

Varnishes containing the thermosetting resin compositions of Examples 1 to 6 were then prepared by the further addition of an amine curing agent and solvent. Each varnish was then used to impregnate glass cloth (at a resin content of 35-50 wt %). The impregnated substrate was B-staged by heating at 171° C. for 1-2 minutes so as to produce a prepeg having 5-10% resin flow. A laminate was then produced by stacking sheets of prepeg and then heating at a temperature of about 185° C. and at a pressure of about 250 psi for 1.5-3 hours. The laminate was then analytically tested and exhibited the following properties:

TABLE 3

(All properties measured on 6 plies to 8 plies 2116 glass fabric laminate as per IPC TM13949)

| Electrical Properties After Press | Test Instrument and Method | Ex 1 | Ex 2 | Ex 3 | Ex 4 | Ex 5 | Ex 6 |
|---|---|---|---|---|---|---|---|
| At 10 GHz: | PNA E8364B (Agilent Tech. Inc.) | | | | | | |
| Dielectric Constant | (vector network analyzer) | 4.59 | 3.66 | 4.20 | 3.53 | 3.95 | 4.30 |
| Loss Tangent | Split post dielectric resonators Method: CGTM | 0.0094 | 0.0087 | 0.0087 | 0.0097 | 0.009 | 0.0092 |
| Thermal Properties | Test Method | | | | | | |
| Glass Transition Temp (° C.) | DSC | 170-180 | 170-180 | 160-170 | 170-190 | 170-180 | 160-170 |
| Time to delaminate at 288° C. (T288), (min) | TMA | 30 | * | * | 30 | * | * |
| Decomposition (° C.) | TGA | 300-500 | 300-500 | 300-500 | 300-500 | 300-500 | 300-500 |
| Flammability | UL 94 | V1 | V1 | V0 | V0 | V1 | V1 |

(* = not tested)

Although making and using various embodiments of the present disclosure have been described in detail above, it should be appreciated that the present disclosure provides many applicable inventive concepts that can be embodied in a wide variety of specific contexts. The specific embodiments discussed herein are merely illustrative of specific ways to make and use the disclosure, and do not delimit the scope of the disclosure.

What is claimed is:

1. A thermosetting resin composition comprising:
    (a) a benzoxazine component comprising two benzoxazine monomer compounds wherein the relative amount of the benzoxazine monomer compounds to one another is 90:10-10:90 (weight:weight) wherein at least one of the benzoxazine monomers is a compound of the general formula (I)

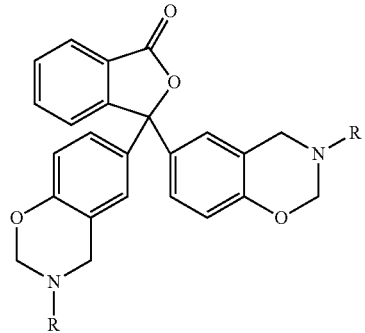

(I)

and at least another benzoxazine monomer is a compound of the general formula (II)

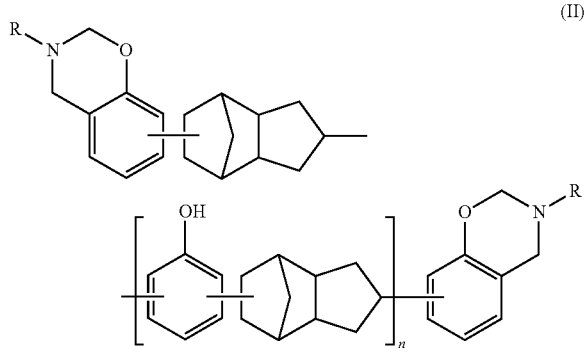

wherein each R is, independently from one another, allyl, unsubstituted or substituted phenyl, unsubstituted or substituted $C_1$-$C_8$ alkyl or unsubstituted or substituted $C_3$-$C_8$ cycloalkyl and n is an integer from 0 to 5; and (b) at least one epoxy resin selected from the group consisting of biphenyl epoxy resin, stilbene epoxy resin, a glycidyl ether of butanediol, a glycidyl ether of polyethylene glycol, a glycidyl ether of polypropylene glycol, a glycidyl ester epoxy resin, vinylcyclohexene diepoxide, 3,4-epoxycyclohexylmethyl-3,4-epoxycyclohexanecarboxylate, 2-(3,4-epoxy)cyclohexyl-5,5-spiro(3,4-epoxy)cyclohexane-m-dioxane, a glycidyl ether of para-xylene modified phenol resin, a glycidyl ether of meta-xylene-modified phenol resin, a glycidyl ether of terpene-modified phenol resin, a glycidyl ether of dicyclopentadiene-modified phenol resin, a glycidyl ether of cyclopentadiene-modified phenol resin, a glycidyl ether of polycyclic aromatic ring-modified phenol resin, a glycidyl ether of naphthalene ring-containing phenol resin, hydroquinone epoxy resin, trimethylolpropane epoxy resin, a linear aliphatic epoxy resin obtained by oxidation of an olefin bond with peracetic acid, diphenylmethane epoxy resin, an epoxide of phenol aralkyl resin, an epoxide of naphthol aralkyl resin, naphthalene epoxy resin and a mixture thereof characterized in that a resultant cured product formed by curing the thermosetting resin composition contains at least two or more of the following well-balanced properties: (1) a glass transition temperature (Tg) of greater than about 170° C.; (2) a decomposition temperature (Td) of greater than about 300° C.; (3) a time to delamination at 288° C. (T288) of greater than about 1 minute; (4) a UL94 flame retardancy ranking of at least V1; (5) a dielectric loss tangent of less than about 0.010 at 10 GHz; and, (6) a dielectric loss constant of less than about 4.00 at 10 GHz.

2. The thermosetting resin composition of claim 1, wherein each R is phenyl.

3. The thermosetting resin composition of claim 1, further comprising a catalyst selected from the group consisting of an amine compound, a compound produced from the amine compound, a tertiary amine compound, an imidazole compound, a hydrazide compound, a melamine compound, an acid anhydride, a phenolic compound, a cyanate ester compound, a dicyandiamide, and a mixture thereof.

4. The thermosetting resin composition of claim 3, further comprising a phosphonated flame retardant.

5. A process for producing a coated article, comprising coating the article with a thermosetting resin composition according to claim 1, and heating the article to cure the thermosetting resin composition.

6. A prepreg comprising: (a) a woven fabric, and (b) a thermosetting resin composition according to claim 1.

7. A laminate comprising: (a) a substrate including a thermosetting resin composition according to claim 1; and (b) a layer of metal disposed on at least one surface of said substrate.

8. The laminate of claim 7 wherein the substrate further comprises a reinforcement of a woven glass fabric, wherein the thermosetting resin composition is impregnated on the woven glass fabric.

9. A printed circuit board (PCB) made of the laminate of claim 7.

10. A thermosetting resin composition comprising:
(a) 10-90 parts by weight, per 100 parts by weight of the thermosetting resin composition, of a benzoxazine component comprising two or more benzoxazine monomer compounds wherein at least one of the benzoxazine monomers is a compound of the general formula (I)

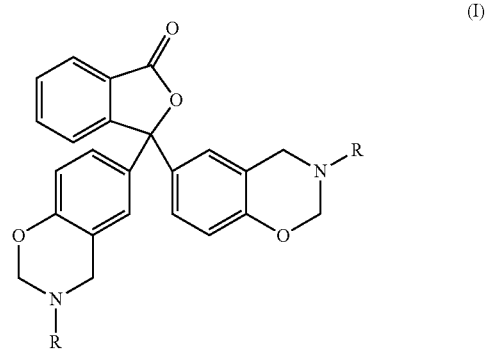

and at least another benzoxazine monomer is a compound of the general formula (II)

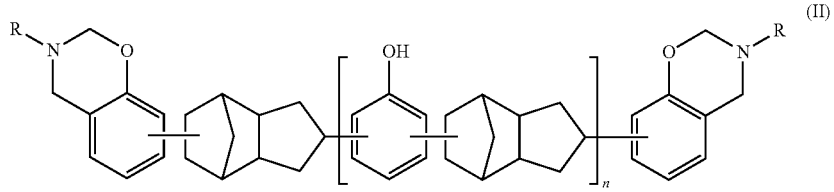

wherein each R is, independently from one another, allyl, unsubstituted or substituted phenyl, unsubstituted or substituted $C_1$-$C_8$ alkyl or unsubstituted or substituted $C_3$-$C_8$ cycloalkyl and n is an integer from 0 to 5 and wherein the relative amount of the benzoxazine monomer compound of formula (I) and the benzoxazine monomer compound of formula (II) is 90:10-10:90 (weight:weight); and (b) 2-60 parts by weight, per 100 parts by weight of the thermosetting resin composition, of at least one epoxy resin selected from the group consisting of biphenyl epoxy resin, stilbene epoxy resin, a glycidyl ether of butanediol, a glycidyl ether of polyethylene glycol, a glycidyl ether of polypropylene glycol, a glycidyl ester epoxy resin, vinylcyclohexene diepoxide, 3,4-epoxycyclohexylmethyl-3,4-epoxycyclohexanecarboxylate, 2-(3,4-epoxy)cyclohexyl-5,5-spiro(3,4-epoxy)cyclohexane-m-dioxane, a glycidyl ether of para-xylene modified phenol resin, a glycidyl ether of meta-xylene-modified phenol resin, a glycidyl ether of terpene-modified phenol resin, a glycidyl ether of dicyclopentadiene-modified phenol resin, a glycidyl ether of cyclopentadiene-modified phenol resin, a glycidyl ether of polycyclic aromatic ring-modified phenol resin, a glycidyl ether of naphthalene ring-containing phenol resin, hydroquinone epoxy resin, trimethylolpropane epoxy resin, a linear aliphatic epoxy resin obtained by oxidation of an olefin bond with peracetic acid, diphenylmethane epoxy resin, an epoxide of phenol aralkyl resin, an epoxide of naphthol aralkyl resin, naphthalene epoxy resin and a mixture thereof characterized in that a resultant cured product formed by curing the thermosetting resin composition contains at least two or more of the following well-balanced properties: (1) a glass transition temperature (Tg) of greater than about 170° C.; (2) a decomposition temperature (Td) of greater than about 300° C.; (3) a time to delamination at 288° C. (T288) of greater than about 1 minute; (4) a UL94 flame retardancy ranking of at least V1; (5) a dielectric loss tangent of less than about 0.010 at 10 GHz; and (6) a dielectric loss constant of less than about 4.00 at 10 GHz.

11. A method for producing a thermosetting resin composition comprising mixing together:

(a) a benzoxazine component comprising two or more benzoxazine monomer compounds wherein at least one of the benzoxazine monomers is a compound of the general formula (I)

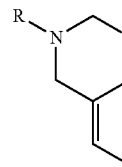
(I)

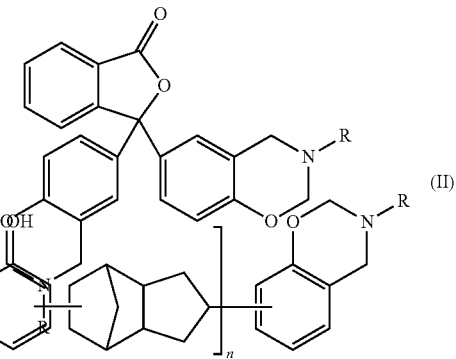
(II)

and at least another benzoxazine monomer is a compound of the general formula (II)

wherein each R is, independently from one another, allyl, unsubstituted or substituted phenyl, unsubstituted or substituted $C_1$-$C_8$ alkyl or unsubstituted or substituted $C_3$-$C_8$ cycloalkyl and n is an integer from 0 to 5 and wherein the relative amount of the benzoxazine monomer compound of formula (I) and the benzoxazine monomer compound of formula (II) is 90:10-10:90 (weight:weight); and (b) at least one epoxy resin selected from the group consisting of biphenyl epoxy resin, stilbene epoxy resin, a glycidyl ether of butanediol, a glycidyl ether of polyethylene glycol, a glycidyl ether of polypropylene glycol, a glycidyl ester epoxy resin, vinylcyclohexene diepoxide, 3,4-epoxycyclohexylmethyl-3,4-epoxycyclohexanecarboxylate, 2-(3,4-epoxy)cyclohexyl-5,5-spiro(3,4-epoxy)cyclohexane-m-dioxane, a glycidyl ether of para-xylene modified phenol resin, a glycidyl ether of meta-xylene-modified phenol resin, a glycidyl ether of terpene-modified phenol resin, a glycidyl ether of dicyclopentadiene-modified phenol resin, a glycidyl ether of cyclopentadiene-modified phenol resin, a glycidyl ether of polycyclic aromatic ring-modified phenol resin, a glycidyl ether of naphthalene ring-containing phenol resin, hydroquinone epoxy resin, trimethylolpropane epoxy resin, a linear aliphatic epoxy resin obtained by oxidation of an olefin bond with peracetic acid, diphenylmethane epoxy resin, an epoxide of phenol aralkyl resin, an epoxide of naphthol aralkyl resin, naphthalene epoxy resin and a mixture thereof; and optionally the following components (c) a catalyst;
(d) a flame retardant; and
(e) an organic solvent.

12. A thermosetting resin composition produced according to the method of claim 11.

* * * * *